United States Patent
Tetelbaum et al.

(10) Patent No.: US 7,739,934 B2
(45) Date of Patent: Jun. 22, 2010

(54) DETECTION SYSTEM FOR POWER TOOL

(75) Inventors: Vladimir Tetelbaum, Redwood City, CA (US); Darius Mostowfi, San Carlos, CA (US); Richard Surprenant, San Jose, CA (US)

(73) Assignee: Power Tool Institute, Cleveland, OH (US)

( * ) Notice: Subject to any disclaimer, the term of this patent is extended or adjusted under 35 U.S.C. 154(b) by 0 days.

(21) Appl. No.: 12/244,994

(22) Filed: Oct. 3, 2008

(65) Prior Publication Data
US 2010/0059144 A1 Mar. 11, 2010

Related U.S. Application Data

(63) Continuation of application No. 12/231,934, filed on Sep. 8, 2008, now abandoned.

(51) Int. Cl.
*B26D 5/00* (2006.01)
*G05B 19/18* (2006.01)
*B26B 5/00* (2006.01)

(52) U.S. Cl. .............................. 83/58; 83/62.1; 83/490; 83/477.1; 83/477.2; 83/581; 700/1; 700/10; 700/21

(58) Field of Classification Search ............... 83/58, 83/62.1, 581, 490, 477.1, DIG. 1, 477.2, 83/781, 62, 471, 471.3, 397, 589, 397.1, 83/630, 292, 644, 788; 702/65; 700/1, 21, 700/10; 307/326, 116, 328; 318/480, 16; 340/686.5, 686.6, 565, 686.1, 689; 144/426; 324/688, 661, 127; 241/36, 100, 236; 337/229
See application file for complete search history.

(56) References Cited

U.S. PATENT DOCUMENTS

| | | | |
|---|---|---|---|
| 4,137,533 A | 1/1979 | Briechle et al. |
| 5,081,406 A | 1/1992 | Hughes et al. |
| 5,942,975 A | 8/1999 | Sørensen |
| 5,957,263 A | 9/1999 | Espenschied |

(Continued)

FOREIGN PATENT DOCUMENTS

| EP | 1093202 A1 | 4/2001 |
|---|---|---|
| EP | 1422022 A1 | 5/2004 |

OTHER PUBLICATIONS

International Search Report and Written Opinion, Application No. PCT/US2009/052875, dated Nov. 24, 2009 (15 pages).

*Primary Examiner*—Ghassem Alie
(74) *Attorney, Agent, or Firm*—K&L Gates LLP

(57) ABSTRACT

Power tool includes a movable blade and a detection system for detecting contact between the blade and an object. Detection system includes an excitation plate capacitively coupling the drive signal to the movable blade. A circuit generates an in phase component signal and a quadrature component signal from a blade current signal indicative of the instantaneous current drawn by the movable blade and calculates an energy of the blade current signal considering the in-phase and the quadrature components. The circuit compares the energy of the blade current signal to an adaptive trigger threshold to detect contact between the blade and the object based on whether the energy of the blade current signal is greater than the adaptive trigger threshold.

18 Claims, 7 Drawing Sheets

U.S. PATENT DOCUMENTS

| | | |
|---|---|---|
| 6,994,004 B2 | 2/2005 | Gass et al. |
| 6,922,153 B2 | 7/2005 | Pierga et al. |
| 6,997,090 B2 | 2/2006 | Gass et al. |
| 7,024,975 B2 | 4/2006 | Gass et al. |
| 7,077,039 B2 | 7/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al |
| 7,225,712 B2 | 6/2007 | Gass et al. |
| 7,231,856 B2 | 6/2007 | Gass et al. |
| 7,259,546 B1 * | 8/2007 | Hastings et al. ......... 324/117 H |
| 7,284,467 B2 | 10/2007 | Gass et al. |
| 7,350,444 B2 | 4/2008 | Gass et al. |
| 7,359,174 B2 | 4/2008 | Gass |
| 7,377,199 B2 | 4/2008 | Gass et al. |
| 7,421,315 B2 | 9/2008 | Gass et al. |
| 7,481,140 B2 | 1/2009 | Gass et al. |
| 7,631,822 B2 * | 12/2009 | Matlin et al. .................. 241/36 |
| 2002/0017181 A1 | 2/2002 | Gass |
| 2002/0020262 A1 | 2/2002 | Gass et al. |
| 2002/0170399 A1 | 11/2002 | Gass et al. |
| 2004/0226800 A1 | 11/2004 | Pierga et al. |
| 2005/0041359 A1 | 2/2005 | Gass |
| 2005/0066784 A1 | 3/2005 | Gass |
| 2005/0139057 A1 | 6/2005 | Gass et al. |
| 2005/0145080 A1 | 7/2005 | Voigtlaender |
| 2005/0155473 A1 | 7/2005 | Gass |
| 2005/0268767 A1 | 12/2005 | Pierga et al. |
| 2006/0123960 A1 | 6/2006 | Gass et al. |
| 2006/0123964 A1 | 6/2006 | Gass et al. |
| 2006/0180451 A1 | 8/2006 | Gass et al. |
| 2006/0247795 A1 * | 11/2006 | Gass et al. ..................... 700/1 |
| 2007/0028733 A1 | 2/2007 | Gass |
| 2007/0131071 A1 | 6/2007 | Gass et al. |
| 2007/0199622 A1 | 8/2007 | Gass et al. |
| 2007/0240786 A1 | 10/2007 | Gass et al. |
| 2008/0025381 A1 | 1/2008 | Lee et al. |
| 2008/0041204 A1 | 2/2008 | Gass |
| 2008/0295660 A1 | 12/2008 | Gass et al. |
| 2009/0000443 A1 | 1/2009 | Gass et al. |

* cited by examiner

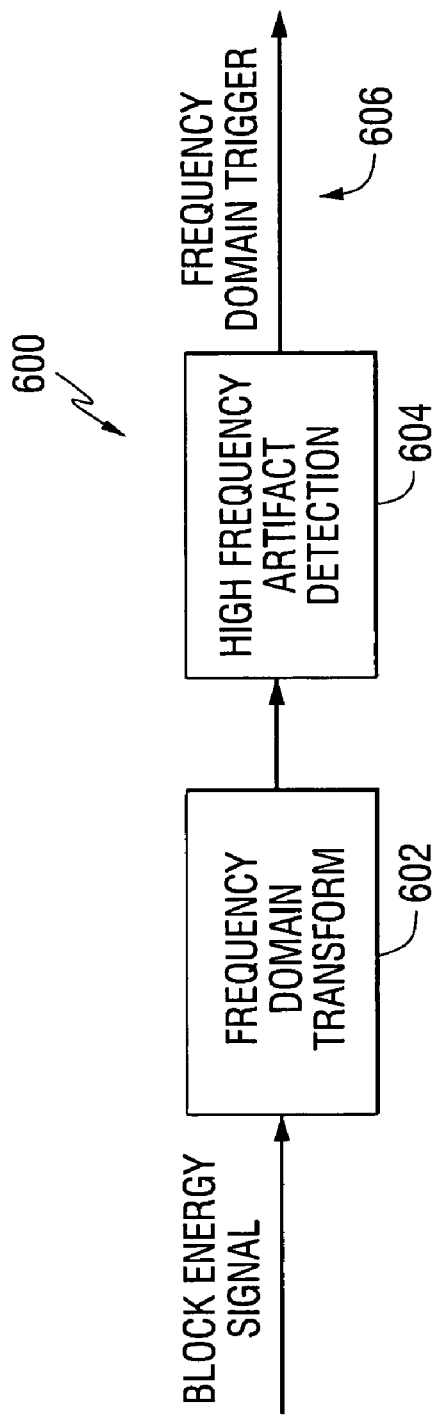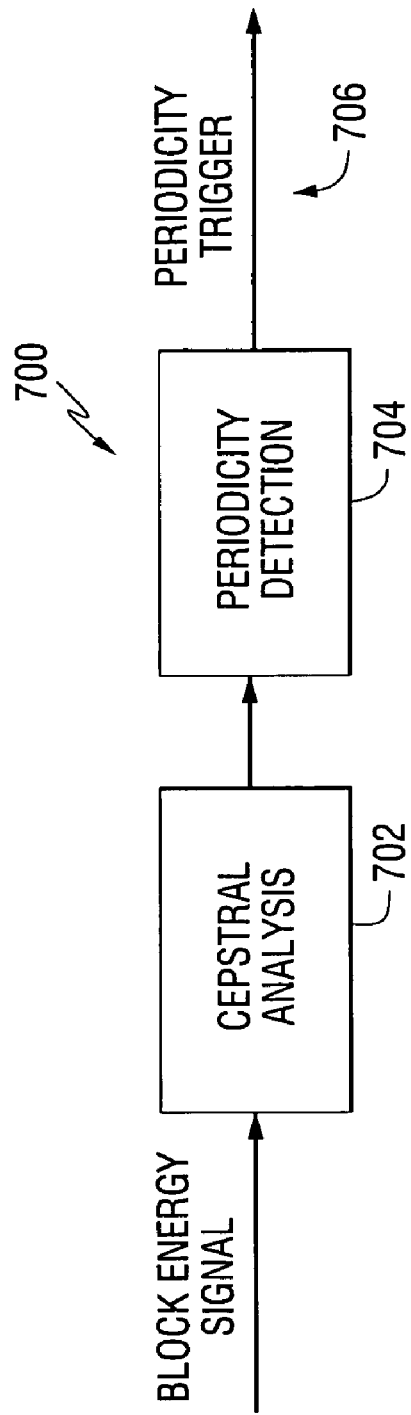

DETECTION SYSTEM FOR POWER TOOL

This application is a continuation of co-pending U.S. application Ser. No. 12/231,934, filed on Sep. 8, 2008, which is incorporated herein by reference in its entirety.

BACKGROUND

Detection or sensing systems have been developed for use with various kinds of manufacturing equipment and power tools. Such detection systems are operable to trigger some type of condition mitigation mechanism by detecting or sensing the proximity of the operator to some part of the equipment or contact with some part of the equipment by the operator. For example, it is known to use a capacitive contact sensing system in a table saw to detect contact between the operator and the blade. Such systems, however, have difficulty distinguishing certain materials, which may cause false activations of the condition mitigation mechanism. Accordingly, improved and more robust capacitive contact sensing systems are needed.

SUMMARY

In one general aspect, the present invention is directed to a power tool with an improved detection system that is capable of distinguishing contact between the movable blade of the power tool and a first object that is supposed to cause activation of a condition mitigation system or "reaction system" from contact between the blade and other objects that are not supposed to cause activation of the reaction system. The first object that is supposed to cause activation of the reaction system may be, for example, a finger or hand of an operator of the power tool. When contact between the blade and the first object is detected, the condition mitigation system (or "reaction system") may be initiated to disable the movable blade (e.g., by stopping its movement and/or changing its location). Such mitigating action may shorten the time period that the blade is in contact with the first object, thus mitigating potential injury to the first object.

According to various embodiments, the power tool may employ a capacitive contact sensing system that generates a signal based on the capacitance between the movable blade and an excitation plate. A drive signal source may be in communication with the excitation plate and may generate a drive signal that is capacitively coupled to the movable blade. A current sensor may be coupled to the excitation plate to sense a current drawn by the blade, which may be referred to as the "blade current signal." In some embodiments, a voltage sensor may be present in addition to or instead of the current sensor to sense a voltage drop across the blade (e.g., a "blade voltage signal"). A circuit (e.g., a processor, field programmable gate array (FPGA), custom application specific integrated circuit (ASIC), or other suitable analog or digital components), may implement one or more algorithms to distinguish contact between the first object and other objects based on the blade current signal and/or blade voltage signal.

According to one example algorithm, the energy of the blade current signal is compared to an adaptive trigger threshold. When the energy level of the blade current signal exceeds the adaptive trigger threshold, it indicates contact between the movable blade and the first object. The energy level of the blade current signal may be determined by any suitable method. For example, the processor may generate an in-phase component signal and a quadrature component signal from the blade current signal. The energy level of the blade current signal may be determined as a function of these two values. The adaptive trigger threshold may be determined by summing a fixed direct current (DC) offset and a mean of the energy of the blade current signal. According to various embodiments, the adaptive trigger threshold also comprises an additive component corresponding to the variance of the phase of a vector formed by the in-phase component and the quadature component and/or an additive component corresponding to the output of a peak detector sensing the energy of the blade current signal.

Various other trigger signals may be used in conjunction with, or in addition to the adaptive trigger algorithm described above. For example, the rate of change (e.g., derivative, variance, etc.) of the adaptive trigger threshold may be monitored. When that rate of change exceeds a predetermined threshold, it may indicate contact between the first object and the blade. Also, for example, a frequency domain trigger may indicate whether the blade current or blade voltage signal includes high frequency artifacts that may suggest contact between the movable blade and the first object. A periodicity trigger may be used to indicate the presence of periodicity in the blade current or blade voltage signal that may suggest contact between the movable blade and the first object.

The various trigger signals may be used separately, or in combination. For example, multiple different trigger signals may be logically OR'd together to generate one consolidated signal that is provided to trigger the reaction system. Also, for example, a composite trigger signal may be generated as a weighted average of a plurality of input signals. It will be appreciated that different embodiments will exhibit different advantages under different conditions. According to various embodiments, however, the power tool may exhibit an increased sensitivity and ability to distinguish between the first object and wet and/or pressure treated wood.

DRAWINGS

Various embodiments of the present invention are described herein by way of example in conjunction with the following figures, wherein:

FIG. 6 is a block diagram of one embodiment of a process for detecting high frequency artifacts in the blade energy signal;

FIG. 7 is a block diagram of one embodiment of a process flow for detecting periodicity in the blade energy signal.

DESCRIPTION

According to various embodiments, the present invention is directed to a power tool, such as a table saw, having a movable blade. The power tool comprises a capacitive sensing based detector system for detecting contact between the blade and objects. A reaction system is in communication with the detection system and, when triggered by the detection system, undertakes a condition mitigation reaction.

Figure 1:
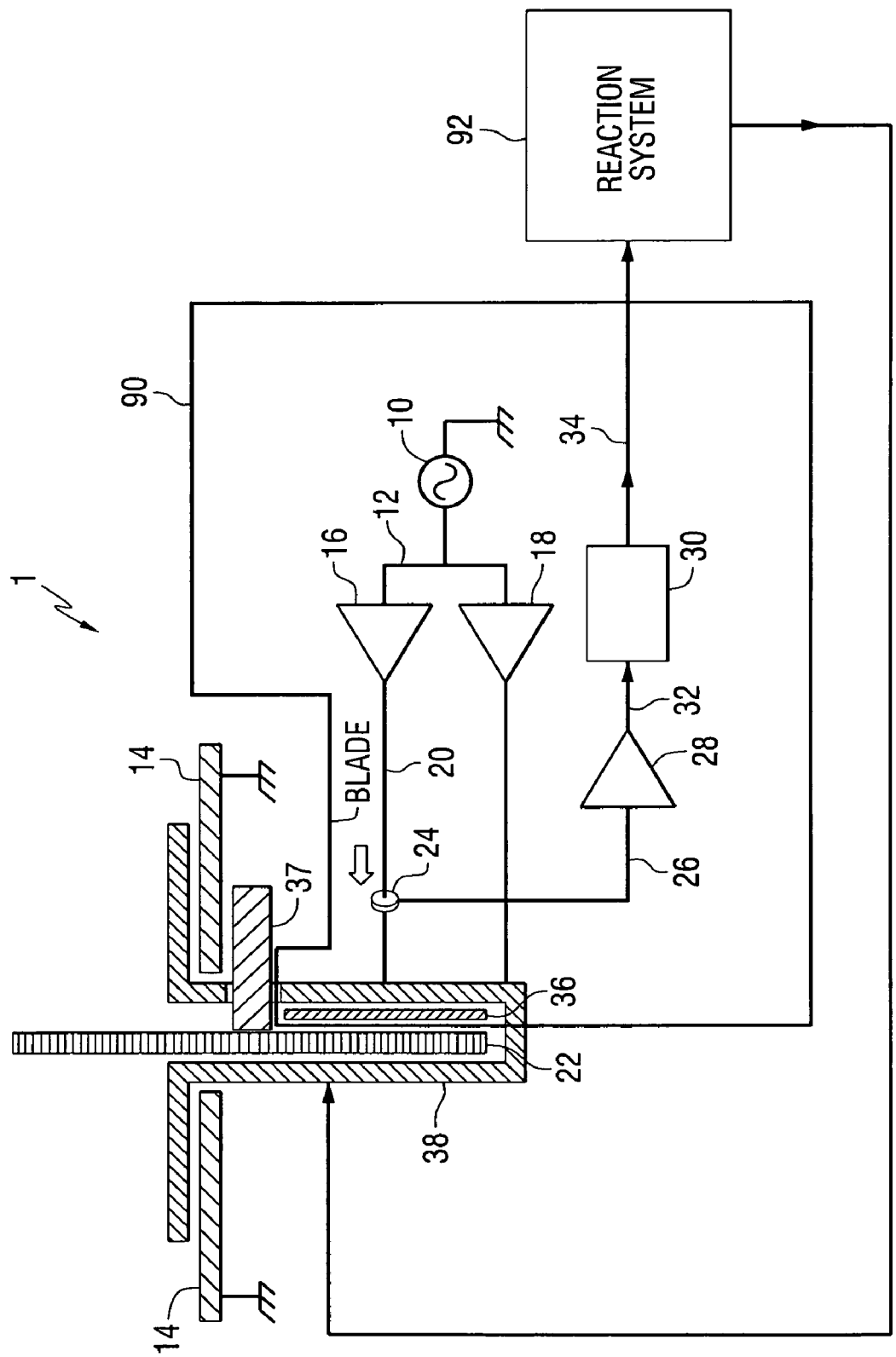
FIG. 1 is an idealized diagram of one embodiment of a table saw including a detection system and a reaction system.

One embodiment of a capacitive sensing based detection system according to the present invention is shown in the idealized diagram of FIG. 1, in which the detection system 90 is shown being implemented in a table saw 1. It should be understood that the detection system 90 can be used with other types of tools and machinery (such as other types of power tools), particularly those with an exposed, movable (e.g. rotating and/or reciprocating) blade, and that such implementations are within the scope of the present invention. For example, the detection system may 90 also be used in portable saws, such as a circular saw or a jig saw.

The detection system 90 operates, according to various embodiments, by driving an excitation voltage onto a movable blade 22 of the saw 1, and detecting the current drawn from the blade 22. This current and/or excitation voltage may show changes in amplitude and phase when the blade 22 comes into contact with an electrically conductive object (such as an operator's hand, finger or other body part, as well as work pieces). The characteristics of these changes can be used to selectively trigger the operation of a reaction system 92. The reaction system 92 may serve to disable the blade 22 by ceasing its motion and/or by dropping or otherwise removing it from the cutting area. One example reaction system 92 may use an explosive charge to drive a stopper (not shown) into the blade 22, arresting its motion. In addition, or instead, an example reaction system 92 may drop or collapse a blade support member (not show) causing the blade 22 to fall below the surface of the table 14. An example reaction system 92 is described in U.S. patent application Ser. No. 11/374,319, filed 13 Mar. 2006, which is incorporated herein by reference in its entirety.

The embodiment of the detection system 90 shown in FIG. 1 comprises an oscillator 10 that generates a time-varying signal on line 12. The time-varying signal may be of any suitable signal type including, for example, a sine wave, a sum of multiple sine waves, a chirp waveform, a noise signal, etc. The frequency of the signal may be chosen to optimize the distinction between contact with the first object, such as a finger or hand, and a second object, such as wood or other material to be cut by the power tool. This frequency may be, for example, 1.22 MHz, but other frequencies can also be used, as well as non-sinusoidal wave shapes. The oscillator 10 is referenced to the saw table 14 or other metallic structure as a local ground. As shown in FIG. 1, the blade 22 is disposed vertically in an opening defined by the saw table 14 (or work surface or cutting surface or platform).

The oscillator 10 may be connected by line 12 to drive two voltage amplifiers or buffers 16, 18. The first voltage amplifier 16 has its output connected to line 20, which is operatively coupled to the saw blade 22 and drives the saw blade 22 to follow the oscillator's output. A current sensor 24 operatively coupled to line 20 provides a signal on line 26 that is fed to an amplifier 28 that is then connected to a processor 30 by line 32. The current sensor 24 may be, for example, a current sense transformer, a current sense resistor, a Hall Effect current sense device, or other suitable type of current sensors. An output line 34 from the processor 30 is operatively connected to the reaction system 92 so that the processor 30 can trigger the reaction system 92 if predetermined conditions are detected indicating, for example, contact between the blade 22 and the first object.

The signal on line 26 is indicative of the instantaneous current drawn by the blade 22. Because the saw blade 22 is in motion during operation of the table saw, and because an effective connection is preferably maintained over the life of the saw, this connection is preferably made through an excitation plate 36, which may be mounted generally parallel to the blade 22. The plate 36 may be driven by the first voltage amplifier 16, and may have a large (e.g., approximately 100 picoFarad (pF)) capacitance relative to the blade 22. Also, the plate 36 may be held in a stable position relative to the side of the blade 22, so that this capacitance remains large through the operating life of the saw. The excitation plate 36 is preferably designed and constructed to follow the blade 22 as its height and bevel angle are adjusted.

The capacitance between the first object and the saw table 14 (or power line ground if one is present) is preferably in the range of approximately 30-50 pF, and as long as the capacitance between the excitation plate 36 and the saw blade 22 is larger than this, the detection thresholds should not be unduly affected by changes in the plate-to-blade capacitance. The plate 36 may also be arranged in parallel with the blade 22 on the side where the blade 22 rests against the arbor 37, so that changes in blade thickness do not affect the clearance between the blade 22 and the plate 36. Other methods of excitation, including contact through the arbor bearings or brush contact with the shaft or the blade, could be used to the same effect. However, the excitation plate arrangement may have advantages in the long-term stability of the excitation connection.

The second-amplifier 18 may be connected to and drive a shield 38 to the same potential as the excitation plate 36. Also, the current drawn by the shield may, but need not, be monitored. The shield 38 preferably extends around the blade 22 under the table 14, and is spaced some distance away from the blade 22 on the top of the table 14. This greatly reduces the static capacitance between the blade 22 and the table 14, which may serve as a ground plane (the table need not be electrically connected to earth ground as shown). The shield 38 may be a continuous pocket as shown here, or may be a mesh or other guard that is electrically equivalent to a Faraday cage at the excitation frequencies provided by the oscillator 10. The shield 38 may have a component that moves with the blade adjustments, or may be large enough to accommodate the blade's adjustment as well as the various blades that may be fitted on the table saw. The shield 38 is preferably designed to move with the blade adjustments, and includes a throat plate area of the table top 14.

The processor 30 may perform various pre-processing steps and implement an adaptive trigger to detect conditions indicative of contact between the first object and the blade 22. The processor 30 may also comprise or have one or more associated analog-to-digital (A/D) converters. The blade current signal from the current sensor 24 may be provided to one or more of the A/D converters, which may generate a corresponding digital signal. Likewise, in some embodiments, a blade voltage signal representing the voltage drop between the blade 22 and the excitation plate 36 may be provided to an A/D converter to generate a digital blade voltage signal. The blade current signal and the blade voltage signal may both be referred to as the blade signal. It will be appreciated that various filtering and/or preprocessing may be performed on the blade signal before it is converted to digital form. The processor 30 may receive the digitized signal and perform various digital signal processing operations and/or compute derivative parameters based on the received signal. The processor 30 may then analyze or otherwise perform operations on the conditioned blade signal to detect conditions indicative of contact between the first object and the blade 22.

It will be appreciated that the detection system 90 may be implemented utilizing digital and/or analog components. For example, in some embodiments, the functionality of the processor 30 may be implemented with discrete analog components including, for example, filters, amplifiers, etc. Also, it will be appreciated that the processor 30 may be programmed to replace some or all of the discrete analog components shown in FIG. 1 including, for example, oscillator 10, amplifiers 16, 18, 28 current sensor 24, etc. Also, the processor 30 may be implemented as any suitable kind of digital processing device including, for example, a digital signal processor (DSP), a system on a chip (SOC), a microcontroller, etc. The processor 30 may include integrated and/or external memory and may also include any suitable form of data storage for storing coded instructions.

Figure 2:
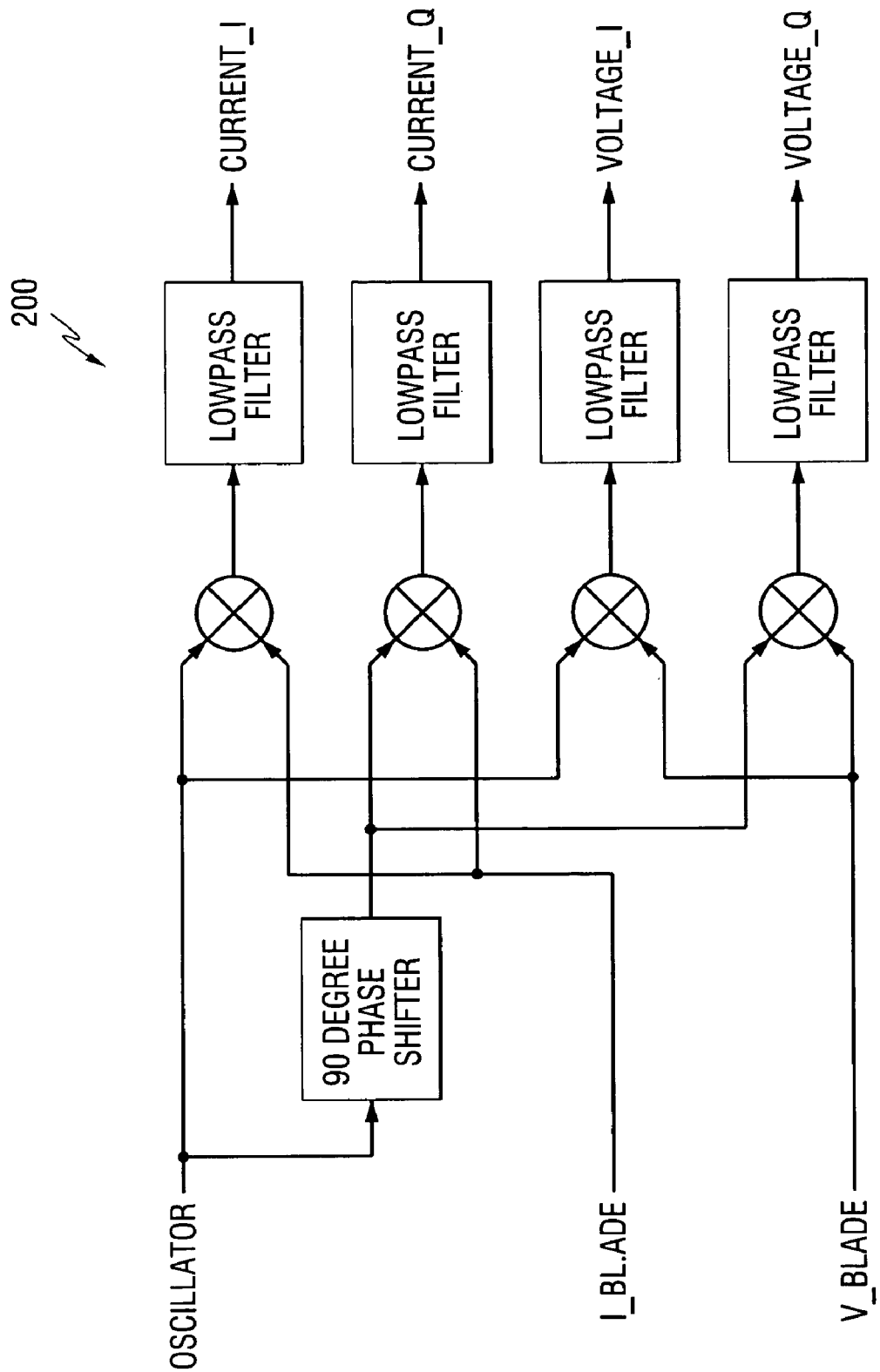
FIG. 2 is a block diagram of one embodiment of a process flow for decomposing the blade signal into I and Q components.

FIG. 2 is a block diagram of one embodiment of a process flow 200 for decomposing the blade signal into I and Q components. The process flow 200 may be implemented by the detection system 90 including, for example, by the processor 30 and/or by analog components. The output of the oscillator 10, the blade current and the blade voltage signal may be phase-shifted, multiplied and filtered as shown to generate I and Q components of one or both signals. The I or in-phase component may be a portion of the blade signal that is in-phase with the oscillator 10. The Q or quadrature component may be a portion of the blade signal that is quadrature or ninety degrees out of phase with the oscillator 10. It will be appreciated that in some embodiments, the processor or other component may rely only on the blade current signal, while in other embodiments, the blade voltage signal may be used in addition to or instead of the current signal.

The amplitude and/or phase of the I and Q components of the blade signal may respond to conditions indicating contact between the first object and the blade 22. When no conductive objects, such as the first object are in contact with, or very close to, the saw blade 22, the capacitance from the blade 22 to ground (e.g., the table 14) is relatively low and relatively constant. The current drawn by the blade 22 is also relatively low, and therefore both the in-phase and quadrature components of the blade current signal will be small. When the first object closely approaches or contacts the blade 22, it appears as a relatively low impedance in series with a larger capacitance to ground (to the earth, or to the table 14). This increases the current drawn by the blade 22. Various other aspects of the amplitude and phase of the blade signal and the I and Q components thereof may indicate contact between the first object and the blade 22, and may differentiate such contact from contact with other materials, such as wet pressure treated wood, that tend to otherwise cause false activations of the reaction system 92.

Figure 3:
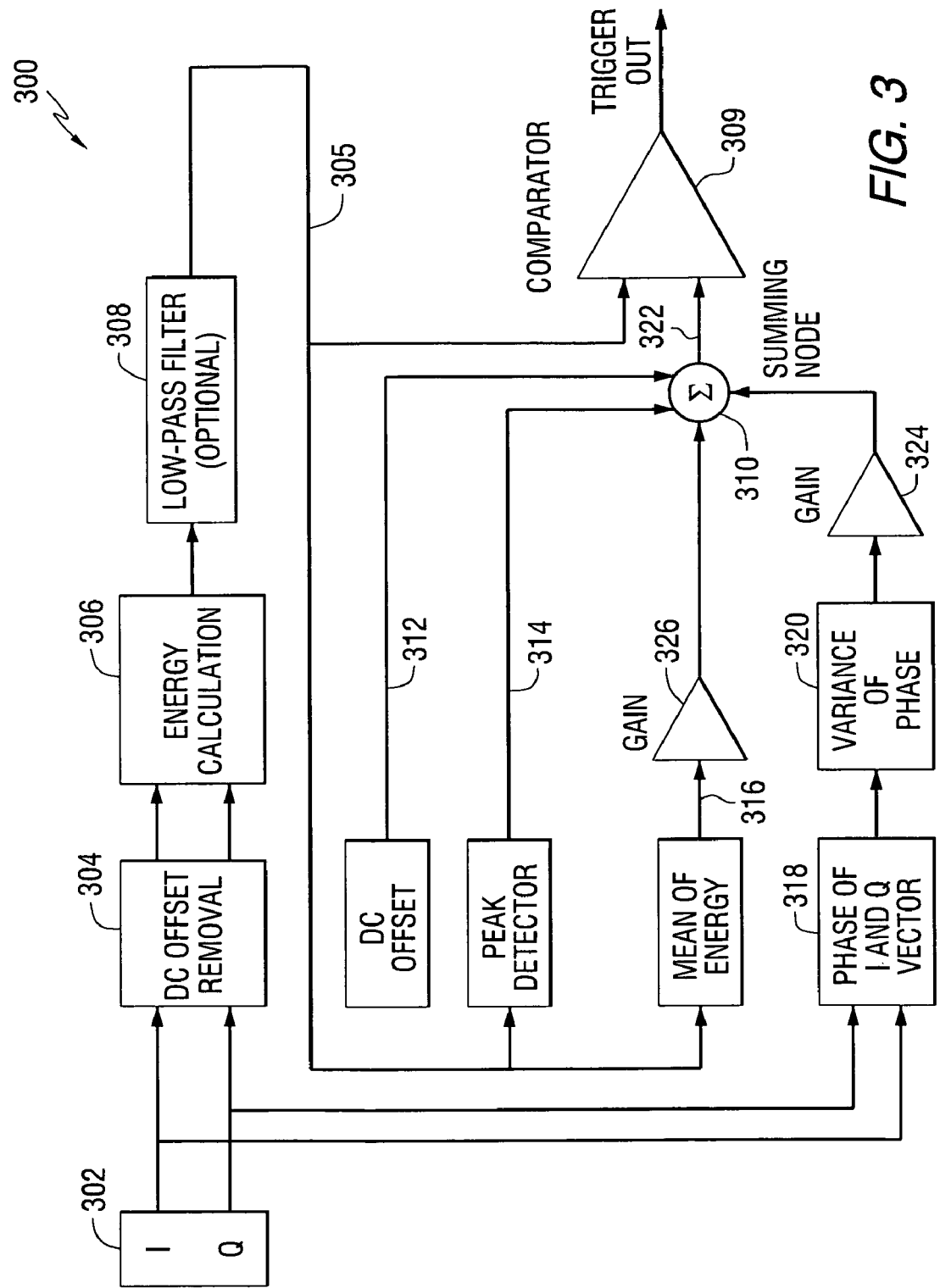
FIG. 3 is a block diagram of one embodiment of an adaptive trigger threshold process for detecting conditions indicating contact between the first object and the blade.

FIG. 3 is a block diagram of one embodiment of an adaptive trigger threshold process 300 for detecting conditions indicating contact between a first object and the blade 22. The various steps of the process 300 may be performed by any suitable analog or digital component or components of the detection system 90, such as, for example, by the processor 30. Also, the embodiment of FIG. 3 is illustrated with operations being performed on the blade current signal, however, it will be appreciated that the blade voltage signal may be used in addition to or instead of the blade current signal. At block 302, the blade current signal may be decomposed into an I component and a Q component, for example, as described above. At box 304, the respective direct current (DC) offsets of the I and Q components may be removed. The resulting signals may be used to calculate the blade energy 305 of the blade current at box 306. The blade energy 305 of the blade current may be found, for example, according to Equation (1) below:

$$\text{BladeEnergy} = I^2 + Q^2 \quad (1)$$

In example embodiments comprising digital components, the blade energy 305 may be calculated as a block energy. A block may represent a predetermined number of samples of the analog blade signal (e.g., current or voltage). For example, thirty-two consecutive samples of the blade signal may be considered one block, though any suitable block size may be used. The block energy may be the energy of the blade signal measured over one block.

According to various embodiments, DC offsets of the I and Q components may not be removed prior to finding blade energy. If desired, the DC offset may then be removed from the resulting blade energy signal. Optionally, a low-pass filter 308 may be applied to the blade energy signal to remove high frequency artifacts. At comparator 309, the blade energy 305 may be compared to an adaptive trigger threshold signal 322. If the blade energy 305 exceeds the adaptive trigger threshold signal, then the comparator 309 may activate the reaction system 92. In example embodiments where the process 300 is performed by digital components, finding the blade energy may also comprise finding a block energy. The block energy may be the blade energy calculated over a predetermined number of samples (N) of the blade signal. The predetermined number of samples (N) may be any suitable number including, for example, thirty-two samples.

The adaptive trigger threshold signal 322 may be generated based on a number of components which are summed at summing block 310. For example, the adaptive trigger threshold signal 322 may be generated based on a DC offset 312 and a mean of the blade energy over time 316. According to various embodiments, an amplifier 326 or digital scaling operation may apply a gain to the mean blade energy 316 prior to the summing node 310. In various embodiments, the adaptive trigger threshold signal 322 may be generated based only on the sum of (1) the DC offset 312 and (2) the mean of blade energy 316. According to other embodiments, however, the adaptive trigger threshold signal 322 may be generated from other components to potentially improve performance. For example, a peak detector signal 314 may also be summed into the adaptive trigger threshold signal 322 at summing block 310. The peak detector signal 314 may follow relatively small peaks in the blade energy signal that occur when wet wood or pressure treated wood is being cut. Adding the peak detector signal 314 may allow the adaptive trigger signal to reduce false triggers when cutting wet wood and/or pressure treated wood.

Figure 4:
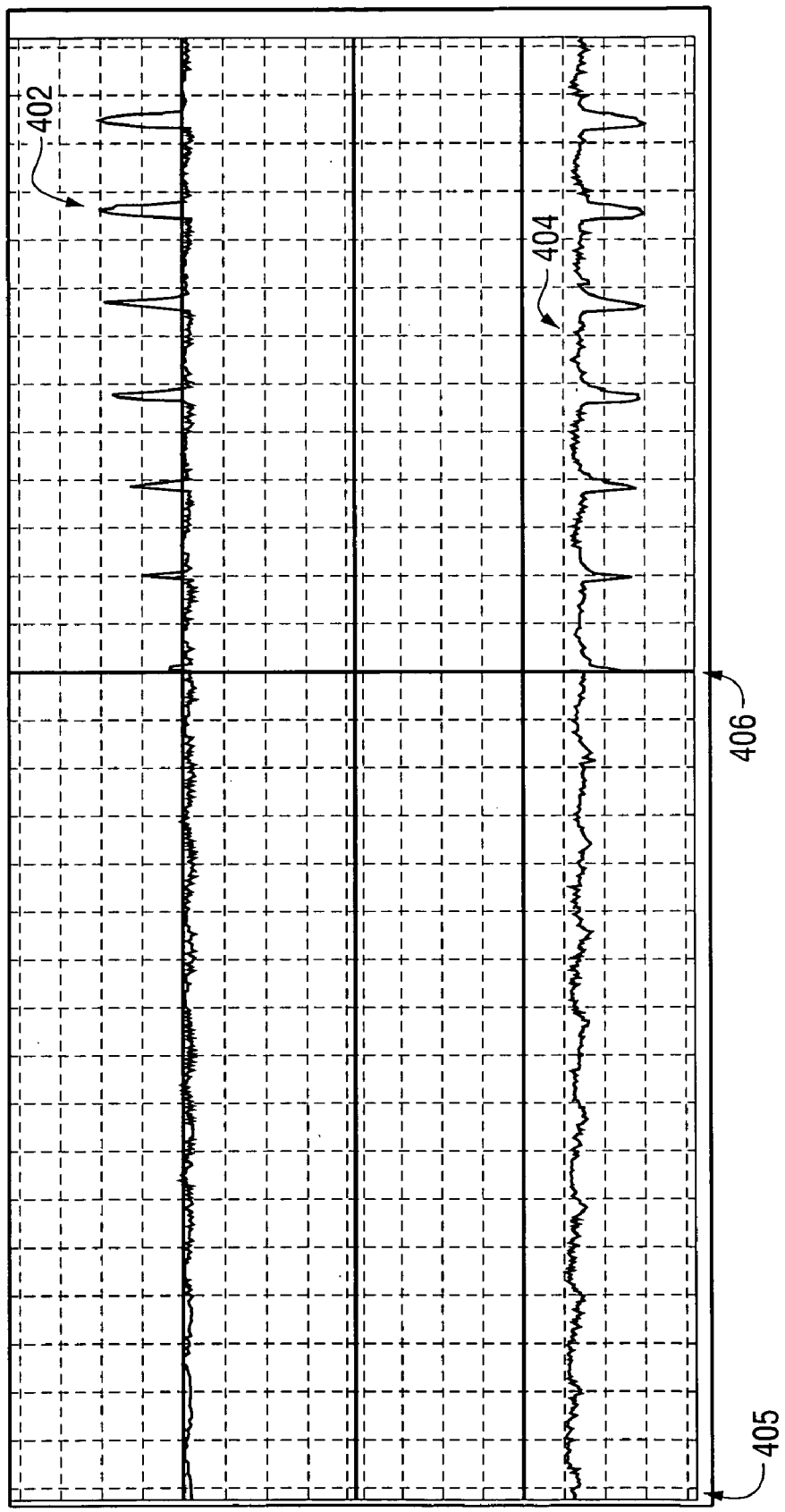
FIG. 4 is a chart showing results of a test measuring the phase of the I and Q components in differing blade conditions.

In addition, the adaptive trigger threshold signal 322 may also be generated based on a signal indicative of the change in phase of a vector formed by I and Q (the IQ vector). FIG. 4 is a chart 400 showing results of a test measuring the I and Q components in differing blade conditions. In the chart 400, the x-axis represents time while the y-axis represents amplitude. Between time points 405 and 406, the blade 22 was in contact only with a piece of pressure treated wood. After point 406, the blade 22 was in contact with the pressure treated wood and a simulated first object, or operator. The simulated operator comprised a hot dog electrically connected with a resistance and a capacitance. The hot dog was selected because it has a capacitance similar to that of a finger. The resistance and capacitance may be chosen to simulate the operator standing with shoes on the floor.

Referring back to the chart 400, prior to time point 406, the phase difference between the I and Q current components (e.g., the phase of the IQ vector) was relatively small. After point 406, when the simulated operator came into contact with the blade 22, the phases of the I and Q current components diverged to a difference approaching 180 degrees. The absolute phase difference of the I and Q current signals may vary based on the type of material being cut. Accordingly, the effect illustrated in FIG. 4 may be sensed over different types of wood by examining the change in the phase difference between the I and Q current signals (e.g., a change in the direction of the IQ vector). The change in phase difference may be represented as a variance of the phase difference, or may be represented as a derivative (e.g., a first derivative) or other indication of change in the phase difference. Referring back to FIG. 3, the phase of the IQ vector may be found at box 318, and the variance of the phase may be found at box 320. It will be appreciated that a derivative or other indication of change in the phase may be substituted for the variance. According to various embodiments a digital scaling operation or an amplifier 324 may apply a predetermined gain to the phase variance prior to summing component 310.

Figure 5:
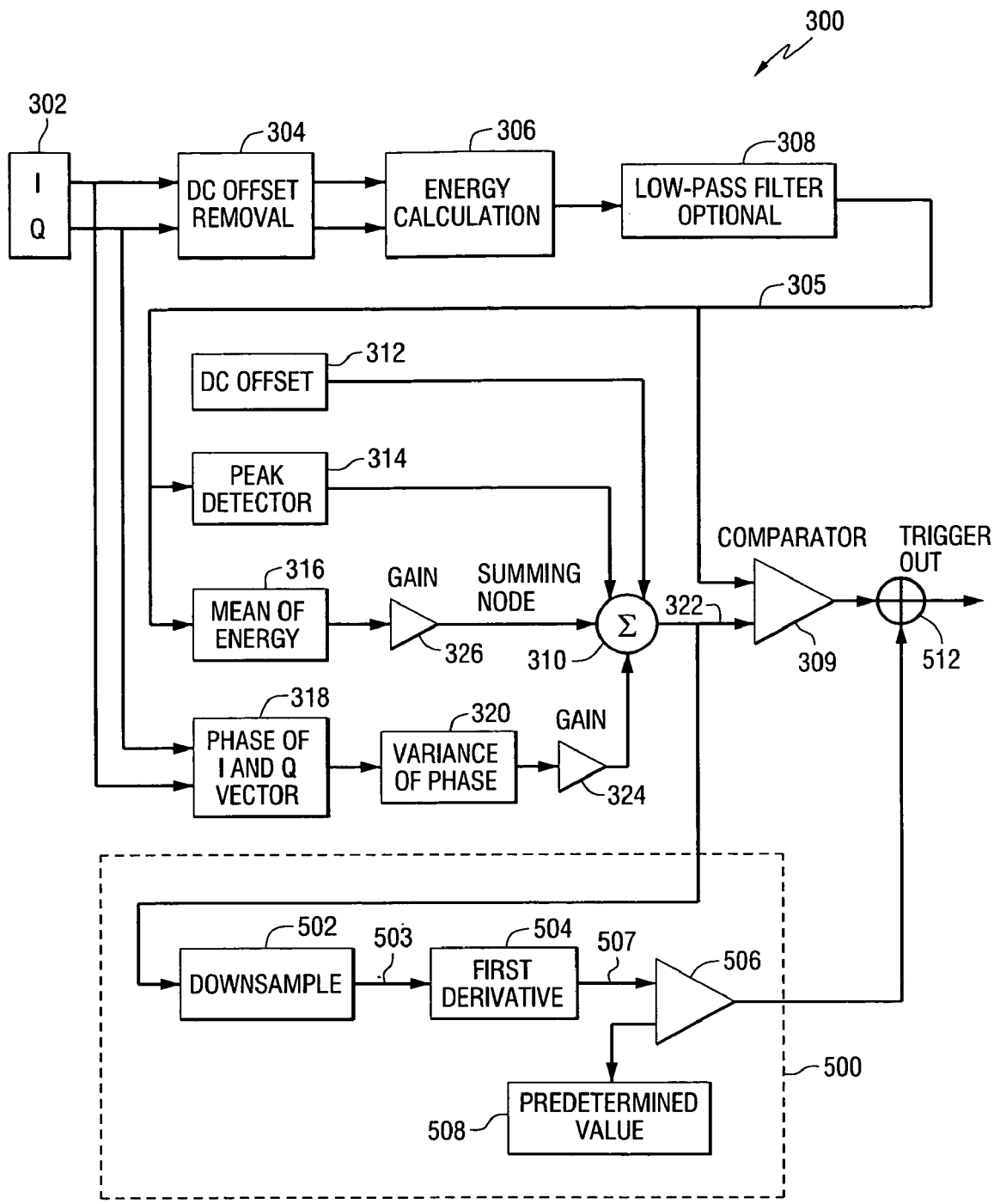
FIG. 5 is a block diagram of another embodiment of an adaptive trigger threshold process for detecting conditions indicating contact between the first object and the blade including an additional adaptive trigger rise module.

FIG. 5 is a block diagram of another embodiment of an adaptive trigger process for detecting conditions indicating contact between the first object and the blade 22 including an additional adaptive trigger threshold rise module 500. It will be appreciated that the process shown in FIG. 5 may be implemented by the processor 30 or any other suitable component or components of the detection system 90. The adaptive trigger threshold rise module 500 may receive as input the adaptive trigger threshold signal 322 and provide as output an indication of whether the rate of change of the adaptive trigger threshold signal exceeds a predetermined value. The inventors have found that when the blade 22 comes into contact with certain types of materials, such as pressure treated and wet woods, the adaptive trigger threshold signal 322 rises sharply. When the adaptive trigger threshold signal 322 rises too sharply relative to the blade energy, the response time of the comparator 309 may be reduced and in extreme conditions, triggers may be missed altogether. Accordingly, the adaptive trigger threshold rise module 500 may trigger the reaction system 92 when the adaptive trigger threshold signal 322 rises at greater than the predetermined value, which may be determined experimentally. For example, trials may be run to determine what rate of change of the adaptive trigger threshold signal corresponds to an unacceptably high reaction time from the reaction system 92. The adaptive trigger threshold rise module 500 may serve as an additional safety mechanism that disables the blade 22 if the adaptive trigger threshold signal 322 rises too sharply to allow detection of the first object with an adequate reaction time. The module 500 may be implemented, for example, by the processor 30 and/or by other analog and/or digital components of the detection system 90.

At box 502, the adaptive trigger threshold signal 322 may be sampled at a predetermined frequency (e.g., every 32 blocks, every 128 blocks, etc. where a block is a set of N samples of the blade signal). The result may be a down-sampled signal 503. The first derivative, or some other indication of change in the sampled signal (e.g., variance) may be taken at box 504, resulting in a change signal 507. At comparator 506, the change signal 507 may be compared to the predetermined rate of change 508. If the change signal 507 is greater than the predetermined rate of change 508, then the output of the comparator 506 may be asserted. At OR element 512, the safety signal may be logically OR'd with the output of the comparator 506. If either the output of the comparator 309 or the output of the comparator 309 is asserted, then the reaction system 92 may be activated. According to various embodiments, the output of the comparator 506 may be used as a stand alone trigger signal without being OR'd with the output of comparator 309.

According to various embodiments, frequency domain methods may be utilized to supplement and/or replace the time-domain methods described above. For example, when the blade 22 is not cutting anything, frequency domain representations of the blade energy may show a sharp spectral line at the carrier frequency (e.g., the frequency of the oscillator 10). When the blade 22 contacts wood, or other material to be cut, the blade energy may increase, however, this increase may be relatively slow. When the blade 22 contacts the first object, the energy may increase sharply. This sharp increase may cause higher frequency artifacts in the frequency domain of the blade energy signal. The frequency domain of the blade energy signal may be monitored for these higher frequency artifacts. When they are sensed, it may indicate that the blade 22 has contacted the first object. It will be appreciated that the described high frequency artifacts may be present in other signals relating to the excitation plate 36 and blade 22 including, for example, the blade current, values derived from the blade current, the voltage drop between the excitation plate 36 and the blade 22, and values derived from the voltage drop between the excitation plate 36 and the blade 22.

FIG. 6 is a block diagram of one embodiment of a process 600 for detecting high frequency artifacts in the blade energy signal. The process 600 may be implemented by the processor 30 and/or by any other suitable analog or digital components of the detection system 90. A frequency domain transform 602 may receive the blade energy signal and derive its frequency spectrum. The frequency domain transform 602 may be any suitable frequency domain transform, such as a discrete Fourier transform. Examples of discrete Fourier transforms may include, fast-Fourier transforms, short-time Fourier transforms (STFT), etc. Because a STFT operation results in the frequency domain representation of a small portion in time of a signal, it may be suited to detecting high frequency artifacts with a minimum of delay time. A STFT operation may receive as input a group of samples of the blade energy taken over a predetermined amount of time. The discrete Fourier transform of each sample group may then be taken individually. Also, according to various embodiments, the frequency domain transform may include a wavelet transform. A wavelet transform may provide superior time and frequency resolution as compared to other methods.

A high frequency artifact detection operation 604 may analyze the frequency spectrum generated by the frequency domain transform 602 and determine whether high frequency artifacts are present. The operation 604 may utilize any suitable detection algorithm to determine the presence of high frequency artifacts. For example, the operation 604 may apply a peak detection algorithm to look for frequency components above a predetermined frequency point that exceed a predetermined peak. The output of the high: frequency artifact detection operation 604 may be a frequency domain trigger signal 606. The process 600 may be used alone (e.g., the frequency domain trigger signal 606 may directly activate a reaction system 92). Also, according to various embodiments, the process 600 may be used as part of a hybrid system. For example, the frequency domain trigger signal 606 may be logically OR'd with other trigger signals with the result activating the reaction system 92.

According to various embodiments, the periodicity of the blade energy or other signal may be monitored. When the first object contacts the blade 22, the amplitude of the blade energy may increase. This increase, however, may be periodic due to amplitude modulation of the carrier (e.g., the output of the oscillator 10). Accordingly, the detection of periodicity in the blade energy may be an indication of contact between the first object and the blade 22. Similar effects may be observed in various other signals relating to the excitation plate 36 and blade 22 including, for example, the blade current, values derived from the blade current, the blade voltage, and values derived from the blade voltage.

FIG. 7 is a block diagram of one embodiment of a process flow 700 for detecting periodicity in the blade energy signal. The process flow 700 may be implemented by the processor 30 and/or by any other suitable components of the detection system 90. A cepstral analysis operation 702 may be performed to generate a cepstral representation of the blade energy or other signal. A periodicity detection operation 704 may detect peaks in the cepstral representation, which may indicate periodicity in the underlying blade energy signal. If the periodicity of the signal exceeds a predetermined threshold, then a periodicity trigger signal 706 may be asserted. The periodicity trigger signal 706 may be used as a stand alone trigger for a reaction system 92, or may be used in conjunction with other trigger signals, for example, by logically OR'ing the signal 706 with the other trigger signals.

Figure 8:
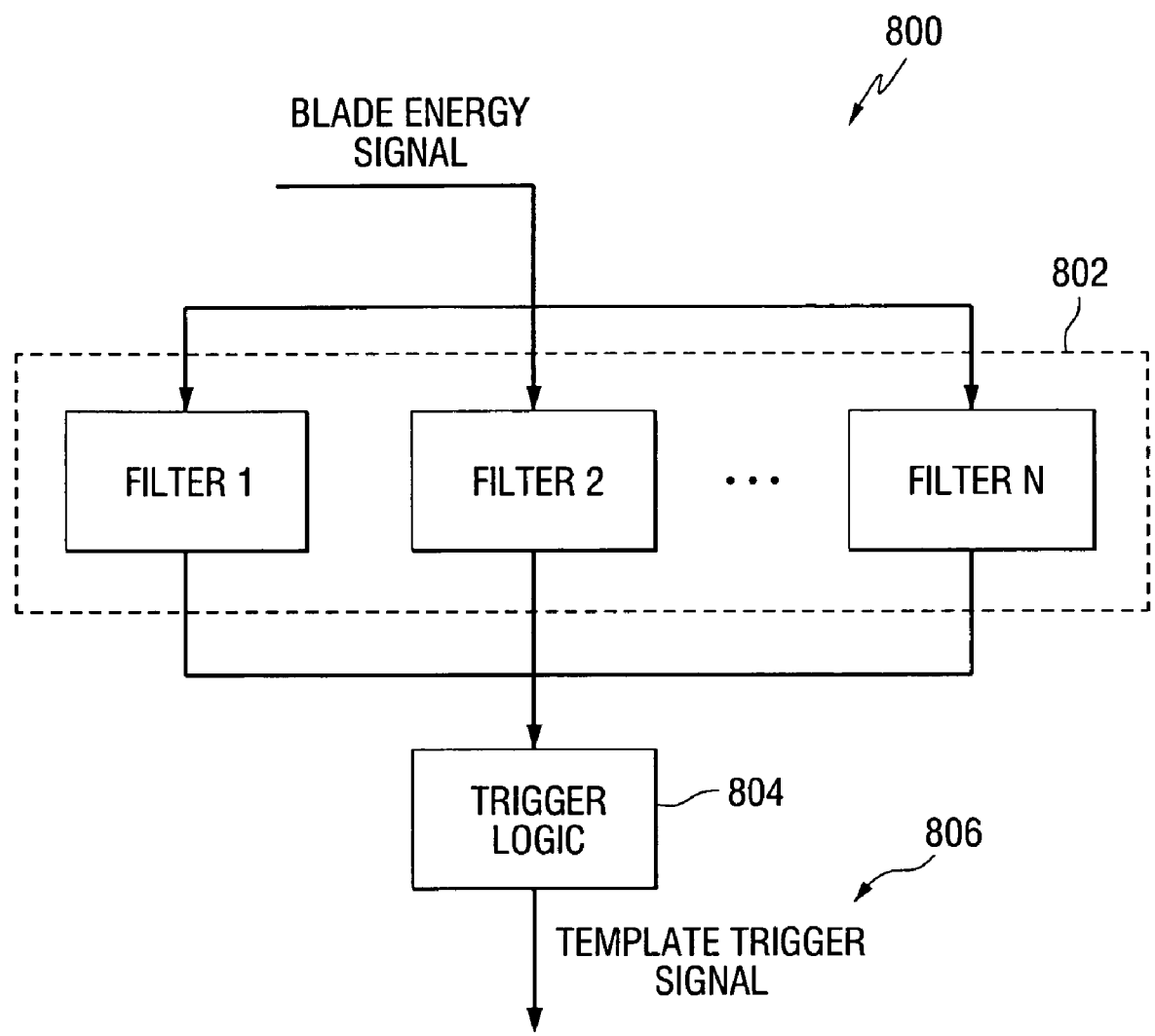
FIG. 8 is a block diagram of one embodiment of a template-based process for detecting indications that the blade has come into contact with the first object.

FIG. 8 is a block diagram of one embodiment of a cross-correlation or template-based process for detecting indications that the blade 22 has come into contact with the first object. The blade energy signal may be provided to a bank of filters 802, which may be analog filters or, for example, may be implemented by the processor 30. Each filter in the bank of filters 802 may be constructed with an impulse response based on the blade energy resulting from body to blade contact for blades having different tooth patterns. Each filter may perform a cross-correlation between the received blade energy signal and its impulse response. Trigger logic 804 may receive the correlation signals from each of the filters in the filter bank 802. If the correlation signals from any of the filter banks exceeds a predetermined threshold, the trigger logic 804 may assert a template trigger signal 806. According to various embodiments, the process 800 may receive a signal (not shown) indicating the tooth pattern of the blade 22 installed on the table saw. The trigger logic 804 may then consider only the correlation signal(s) output by the filter or filters corresponding to the tooth pattern of the installed blade.

It will be appreciated that the frequency domain trigger signal 606, the periodicity trigger signal 706 and the template trigger signal 806 may be utilized alone as an indication of contact between the first object and the blade 22. In this case, the respective trigger signals may be tied directly the reaction system 92, and may trigger the reaction system 92 when asserted. According to other embodiments, one or more of the trigger signals 606, 706, 806 may be used in conjunction with other triggering methods described herein. For example, one or more of the trigger signals 606, 706, 806 may be logically OR'd with the output of the comparator 309 to form a consolidated trigger signal that may be provided to activate the reaction system 92. According to various embodiments, the trigger signals may be weighted. For example, trigger signals with the highest accuracy and/or the best correlation to actual blade/human contact may be given greater weights.

The functionality of the block diagrams 300, 500, 600, 700, 800 may be implemented by discrete analog or digital components, or as software code stored on a memory device to be executed by the processor 30 using any suitable computer instruction type. For example, the functionality of the block diagrams may be implemented with components of the detection system 90 described above. Also, according to various embodiments, the various components of the diagrams 300, 500 may be implemented as firmware to be executed by the processor 30 and stored in a memory device, such as a RAM, a ROM or any other suitable memory device.

The embodiments disclosed herein may be implemented with either digital or analog hardware. Some embodiments may include both digital and analog components. It will be appreciated that when analog-specific terminology is used to describe a component in the specification, a corresponding digital component or operation may be substituted. For example, some or all of the analog amplifiers described herein may be replaced by digital scaling operations performed, for example, by a digital signal processor (DSP) or other digital component.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A power tool comprising:
a movable blade; and
a detection system for detecting contact between the blade and an object, the detection system comprising:
an excitation plate capacitively coupling the drive signal to the movable blade; and
a circuit in communication with the excitation plate, wherein the circuit is configured to:
generate an in-phase component signal and a quadrature component signal from a blade current signal indicative of the instantaneous current drawn by the movable blade;
calculate an energy of the blade current signal considering the in-phase component and the quadrature component; and
compare the energy of the blade current signal to an adaptive trigger threshold to detect contact between the blade and the object based on whether the energy of the blade current signal is greater than the adaptive trigger threshold, wherein the adaptive trigger threshold is based on a sum of a first plurality of values comprising a fixed direct current (DC) offset, and a mean of the energy of the blade current signal.

2. The power tool of claim 1, further comprising a reaction system in communication with the detection system, wherein the detection system triggers the reaction system when contact between the object and the blade is detected.

3. The power tool of claim 1, wherein the first plurality of values further comprises a variance of a phase of a vector formed by the in-phase component and the quadature component.

4. The power tool of claim 1, wherein the first plurality of values further comprises a derivative over time of a phase of a vector formed by the in-phase component and the quadrature component.

5. The power tool of claim 1, wherein the first plurality of values further comprises a peak value of the energy of the blade current signal.

6. The power tool of claim 1, further comprising a reaction system in communication with the detection system, wherein the detection system triggers the reaction system when a rate of change of the adaptive trigger threshold exceeds a predetermined value.

7. The power tool of claim 6, wherein the rate of change of the adaptive trigger threshold is a derivative of the adaptive trigger threshold.

8. The power tool of claim 6, wherein the circuit is further configured to measure the rate of change of the adaptive trigger threshold by sampling the adaptive trigger threshold at a predetermined interval.

9. The power tool of claim 1, wherein the circuit is further configured to remove a direct current (DC) offset from the in-phase component and remove a DC offset from the quadature component prior to calculating the energy of the blade current signal.

10. The power tool of claim 1, wherein the circuit is further configured to sense high frequency artifacts in a first signal to detect contact between the blade and the object based on whether the high frequency artifacts are present, wherein the first signal is selected from the group consisting of the blade current signal, a signal derived from the blade current signal, a voltage drop between the movable blade and the excitation plate, and a signal derived from the voltage drop between the movable blade and the excitation plate.

11. The power tool of claim 10, wherein detecting the high frequency artifacts comprises at least one action selected from the group consisting of: performing a short-time Fourier transform (STFT) on the at least one signal and performing a wavelet analysis of the at least one signal.

12. The power tool of claim 1, wherein the circuit is further configured to find correlations between a first signal and a plurality of signal templates to detect contact between the blade and the object based on whether a correlation between the first signal and at least one of the plurality of templates is greater than a predetermined threshold, wherein each of the plurality of signal templates corresponds to energy levels of the first signal indicative of contact between the object the movable blade, and wherein the first signal is selected from the group consisting of the blade current signal, a signal derived from the blade current signal, a voltage drop between the movable blade and the excitation plate, and a signal derived from the voltage drop between the movable blade and the excitation plate.

13. The power tool of claim 12, wherein the plurality of signal templates comprise signal templates corresponding to blades having different tooth patterns.

14. The power tool of claim 1, wherein the circuit is further configured to sense periodicity in a first signal to detect contact between the blade and the object based on whether the periodicity exceeds a predetermined threshold, wherein the first signal is selected from the group consisting of the blade current signal, a signal derived from the blade current signal, a voltage drop between the movable blade and the excitation plate, and a signal derived from the voltage drop between the movable blade and the excitation plate.

15. A power tool comprising:
a movable blade; and
a detection system for detecting contact between the blade and an object, the detection system comprising:
an excitation plate capacitively coupling the drive signal to the movable blade; and
a circuit in communication with the excitation plate, wherein the circuit is configured to:
generate an in-phase component signal and a quadrature component signal from a blade current signal indicative of the instantaneous current drawn by the movable blade;
calculate an energy of the blade current signal considering the in-phase component and the quadrature component; and
measuring a rate of change of an adaptive trigger threshold to detect contact between the blade and the object based on whether the rate of change exceeds a predetermined value, wherein the adaptive trigger threshold is based on a sum of a first plurality of values comprising a fixed direct current (DC) offset, and a mean of the energy of the blade current signal.

16. The power tool of claim 15, further comprising a reaction system in communication with the detection system, wherein the detection system triggers the reaction system when contact between the object and the blade is detected.

17. The power tool of claim 15, wherein the rate of change of the adaptive trigger threshold is a derivative of the adaptive trigger threshold.

18. The power tool of claim 15, wherein the circuit is further configured to measure the rate of change of the adaptive trigger threshold by sampling the adaptive trigger threshold at a predetermined interval.

* * * * *